(12) United States Patent
Pizot et al.

(10) Patent No.: US 9,052,861 B1
(45) Date of Patent: Jun. 9, 2015

(54) SECURE CONNECTIONS BETWEEN A PROXY SERVER AND A BASE STATION DEVICE

(75) Inventors: Laurent Pizot, Camas, WA (US); Loren D. Chapple, Vancouver, WA (US); Venugopal Kumarahalli Srinivasmurthy, Bangalore (IN); Deepak Ramachandran, Andhra Pradesh (IN); Sudhindra Venkatesh Kulkarni, Bangalore (IN); Jojee Thomas Chackalackal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 282 days.

(21) Appl. No.: 13/072,722

(22) Filed: Mar. 27, 2011

(51) Int. Cl.
G06F 15/16 (2006.01)
G06F 3/12 (2006.01)

(52) U.S. Cl.
CPC .................................. G06F 3/1285 (2013.01)

(58) Field of Classification Search
USPC ......................................... 709/203, 217–229
See application file for complete search history.

(56) References Cited

U.S. PATENT DOCUMENTS

| 7,359,076 | B2 * | 4/2008 | Uchino ........................ 358/1.15 |
| 8,453,220 | B2 | 5/2013 | Pizot et al. |
| 2003/0083996 | A1 | 5/2003 | Fischer |
| 2004/0006705 | A1 | 1/2004 | Walker |
| 2004/0073684 | A1 * | 4/2004 | Jodra et al. .................... 709/228 |
| 2004/0093419 | A1 * | 5/2004 | Weihl et al. ................... 709/229 |
| 2004/0203668 | A1 | 10/2004 | Bowne et al. |
| 2004/0240031 | A1 | 12/2004 | Anderson et al. |
| 2004/0249934 | A1 | 12/2004 | Anderson et al. |
| 2005/0015456 | A1 | 1/2005 | Martinson |
| 2005/0026593 | A1 | 2/2005 | Anderson et al. |
| 2005/0216602 | A1 | 9/2005 | Armstrong et al. |
| 2005/0270569 | A1 | 12/2005 | Hayashi |
| 2006/0080444 | A1 | 4/2006 | Peddemors et al. |
| 2007/0086426 | A1 | 4/2007 | Bonta et al. |
| 2007/0208674 | A1 | 9/2007 | Oliver |
| 2008/0004017 | A1 | 1/2008 | Shimizu |
| 2008/0028029 | A1 | 1/2008 | Hart |
| 2008/0155152 | A1 * | 6/2008 | Keeney et al. ................ 710/220 |
| 2008/0301784 | A1 | 12/2008 | Zhu et al. |
| 2009/0027700 | A1 | 1/2009 | Kim et al. |

(Continued)

FOREIGN PATENT DOCUMENTS

| LV | 13720 B | 8/2008 |
| LV | 13720 B | 8/2008 |
| WO | WO-2007095691 | 8/2007 |

OTHER PUBLICATIONS

Laura Smith, Cloud Computing Identity Management Standards Could Push Cloud Use, Search CIO.com.

(Continued)

*Primary Examiner* — Brian J Gillis
*Assistant Examiner* — Michael A Keller

(57) ABSTRACT

Systems and methods of establishing a secure connection between a proxy server and a base station device are disclosed. An example of a method includes providing a proxy server with a session token for a mobile device from a cloud service. The method also includes providing a session code directly to the mobile device from the cloud service based on the session token. The method also includes providing access by the proxy server to the base station device if the proxy server provides the session code to the cloud service.

26 Claims, 3 Drawing Sheets

(56) References Cited

U.S. PATENT DOCUMENTS

| | | | |
|---|---|---|---|
| 2009/0113527 A1 | 4/2009 | Naaman et al. | |
| 2009/0158032 A1 | 6/2009 | Costa et al. | |
| 2009/0181641 A1* | 7/2009 | Fiatal | 455/406 |
| 2009/0204816 A1 | 8/2009 | Lapstun et al. | |
| 2009/0228967 A1 | 9/2009 | Gbadegesin | |
| 2009/0248632 A1 | 10/2009 | Subramanian | |
| 2009/0254745 A1 | 10/2009 | Ganesan | |
| 2009/0271847 A1 | 10/2009 | Karjala et al. | |
| 2010/0005146 A1 | 1/2010 | Drako et al. | |
| 2010/0039662 A1 | 2/2010 | Reddy et al. | |
| 2010/0082682 A1 | 4/2010 | Kinoshita | |
| 2010/0107225 A1 | 4/2010 | Spencer et al. | |
| 2010/0151831 A1* | 6/2010 | Hao et al. | 455/412.2 |
| 2010/0161759 A1* | 6/2010 | Brand | 709/218 |
| 2010/0175113 A1 | 7/2010 | Borghetti et al. | |
| 2010/0212004 A1 | 8/2010 | Fu | |
| 2010/0242038 A1* | 9/2010 | Berrange et al. | 718/1 |
| 2010/0277528 A1 | 11/2010 | King et al. | |
| 2011/0093567 A1* | 4/2011 | Jeon et al. | 709/219 |
| 2011/0099616 A1* | 4/2011 | Mazur et al. | 726/7 |
| 2011/0213711 A1 | 9/2011 | Skinner et al. | |
| 2011/0235085 A1* | 9/2011 | Jazayeri et al. | 358/1.14 |
| 2012/0026536 A1* | 2/2012 | Shah | 358/1.15 |
| 2012/0057193 A1 | 3/2012 | Jazayeri et al. | |
| 2012/0096525 A1* | 4/2012 | Bolgert et al. | 726/6 |
| 2012/0099146 A1* | 4/2012 | Stokes et al. | 358/1.15 |
| 2012/0120436 A1* | 5/2012 | Damera-Venkata et al. | 358/1.13 |
| 2012/0159584 A1 | 6/2012 | Pizot et al. | |
| 2012/0233678 A1* | 9/2012 | Pal | 726/7 |

OTHER PUBLICATIONS

Scott Merrill, http://techcrunch.com, "Review: HP Photosmart D110a, the printer with an email address," Sep. 7, 2009 (7 pages).
Harry McCracken, http://technologizer.com, "HP's ePrint from devices with no printing support," Jun. 7, 2010 (6 pages).
Adam Ostrow, http://mashable.com, "HP Looks to Change the Way We Print," Jun. 7, 2010 (8 pages).
Hewlett-Packard, http://reviews.shopping.hp.com, "Customer reviews for hp HP Photosmart e-All-in-One Printer," including a review as early as Jun. 23, 2010 (5 pages).
David Stone, http://www.pcmag.com, HP PhotoSmart e-All-in-One-D110a, Aug. 20, 2010 (7 pages).
Gideon, Thomas, "More on OAuth and Its Future," Jan. 18, 2010, 5 pages.
Hammer-Lahav, Eran, "Beginner's Guide to OAuth—Part II: Protocol Workflow," Oct. 15, 2007, 15 pages.
Roche, Niall, "The Cybermagic of Whitelists," available Dec. 25, 2007. <http://www.streetdirectory.com/travel_guide/2330/computers_and_the_internet/the_cybermigic_of_whitelists.html>.
Taylor, Bret, "OAuth WRAP support in FriendFeed for feedback," Dec. 21, 2009, 2 pages.
U.S. Appl. No. 13/153,401, Notice of Allowance dated Oct. 29, 2014, pp. 1-3 and attachments.
Apple Computer, Inc., "Bonjour: Connect computers and electronic devices automatically, without any configuration," Apr. 2005, <http://hes-standards.org/doc/SC25_WG1_N1164.pdf>.
Hewlett-Packard Development Company, L.P., "HP Web Jetadmin software—overview and features," Jan 16, 2008, (Web Page), <http://web.archive.org/web/20080116160241/http://h20331. www2.hp.com/Hpsub/cache/332262-0-0-225-121.html>.
Hewlett-Packard Development Company, L.P., "Security and HP Web Jetadmin 10.1," whitepaper, 2008, <http://www.cannon4.comisolutions/pdf/HP_WJA_security_whitepaper_en.pdf>.
Oasis, "SOAP-over-UDP Version 1.1," Oasis Standard, Jul. 1, 2009, <http://web.archive.org/web/20100710071459/http://docs.oasis-open.org/ws-dd/soapoverudp-1.1- spec-os.html>.
Pizot. L., et al. (inventors), "Establishing a Secure Connection Between a Print Generation Service and a Base Station Printer," U.S Appl. No. 13/072,720, filed Mar. 27, 2011, 18 pages.
Pizot, L., et al., (inventors) "Secure Connections Between a Proxy And a Base Station Device," U.S. Appl. No. 13/072,720, filed Mar. 27, 2011, 20 pages.
U.S. Appl. No. 13/153,401, Notice of Allowance dated Feb. 25, 2014.
Wikipedia, "Access control," May 4, 2010, <http://web,archive.org/web/20100504090238/http://en.wikipedia.orgiwiki/Acces_Control>.
Wikipedia, "Anti-sparn techniques," Oct. 4, 2010, <http://web.archive.org/web//20101004152834/ http://en.wikipedia.orglwiki/Anti-spam_techniques>.
Wikipedia, "Antivirus software," Nov. 15, 2010, <http://web.arehive/org/web/20101115195952111tp://en.wikipedia,orglwikilAnti-Virus>.
Wikipedia, "Bonjour (Software)," Feb. 9, 2010, <http://web.archive.org/web/20100209205426/http://en.wikipedia.org/wiki/Bonjour_(software).
Wikipedia, "Password," Oct. 26, 2010, <http://web.archive.org/web/20101026023312/http://en.wikipedia.org/wiki/Password>.
Wikipedia, "Transport Layer Security," Nov. 12, 2010, <http://web.archive.org/web/20101112221312/http://en.wikipedia.orgiwiki/Secure_Sockets_Layer>.
Wikipedia, "Ws-Discovery," Nov. 11, 2010, <http://web.archive.org/web/20101111230811/http://en.wikipedia.org/wiki/WS-Discovery>.

* cited by examiner

_US 9,052,861 B1_

SECURE CONNECTIONS BETWEEN A PROXY SERVER AND A BASE STATION DEVICE

BACKGROUND

Mobile devices, including for example laptop computers and mobile phones (so-called "smart" phones), provide remote access to more than computer files and email. For example, users may access security systems, lighting control systems, television recording devices, and even peripheral devices (e.g., printers) for home or office computers, from just about anywhere a network connection is available, including the Internet and mobile communications networks.

Printers and other devices may be enabled for remote access by assigning a wide area network (WAN) address to the printer, such as a uniform resource locator (URL) or email address. The user can then access the printer from any network using the WAN address, in much the same way that the user would access the printer on the local network using the printer's local area network (LAN) ID.

In addition, the user may desire to receive information from a proxy service. The proxy service may provide information services (e.g., updates) for a user. For example, a proxy service for a news server may provide story updates. Or for example, a proxy service for a medical records provider may provide the patient with updates to their medical records. The user may desire to have the information from the proxy service automatically printed at their home printer, so that they will have a printed record.

Unfortunately, even long and randomly assigned WAN addresses can be determined by unauthorized users (so-called "hackers"). The hackers can then send unauthorized communications (so-called "spam") to the printer. Not only is this unauthorized communication a nuisance for the user, it also wastes paper, ink, and other resources (e.g., electricity), and causes unnecessary wear and tear on the device.

DETAILED DESCRIPTION

Briefly, systems and methods are disclosed for establishing a secure connection between a proxy service, accessed and initiated by a user on a mobile device (e.g., a smart phone, tablet, or laptop/netbook computer), and a base station device (e.g., a printer) via a cloud service. In one example, the cloud service generates a transaction or session token for the proxy service, which is returned to the proxy service, and from the proxy service to the mobile device. The mobile device sends the session token to the cloud service for validation. The cloud service returns a transaction or session code to the mobile device, which provides the session code to the proxy service. The proxy service can then access the base station device via the cloud service using the session code for a predetermined time even if the user is no longer connected to the proxy service.

This three-way authorization process makes it unlikely that a spammer can access the base station device. Even if the spammer falsely requests and retrieves a session token, the session token cannot be verified for the spammer without the user's mobile device providing the session token back to the cloud service for validation. To further enhance security, the session token expires after a predetermined time. Therefore, even if the spammer intercepts the session code, the session code will automatically expire at a predetermined time.

In an embodiment, the user is able to submit print requests from a proxy service (e.g., a third party website for generating information, such as an online news service). Also in an embodiment, both the session code and a device identification (ID) for the base station device is needed to access the base station device. This combination make unauthorized access to the base station device even more unlikely.

Accordingly, the systems and methods described herein enable inherently unsecured printers to be accessed from third-party devices such as the proxy service, even when the user is not connected to the proxy service or the printer, while still providing a level of security which reduces or altogether prevents access by unauthorized users (e.g., hackers). Therefore, hackers are unable to send unauthorized communications (e.g., spam) to the printer. This level of security makes the printer more user-friendly without becoming a nuisance for the user, wasting resources (e.g., paper and ink), and/or causing unnecessary wear and tear for the printer.

Figure 1:
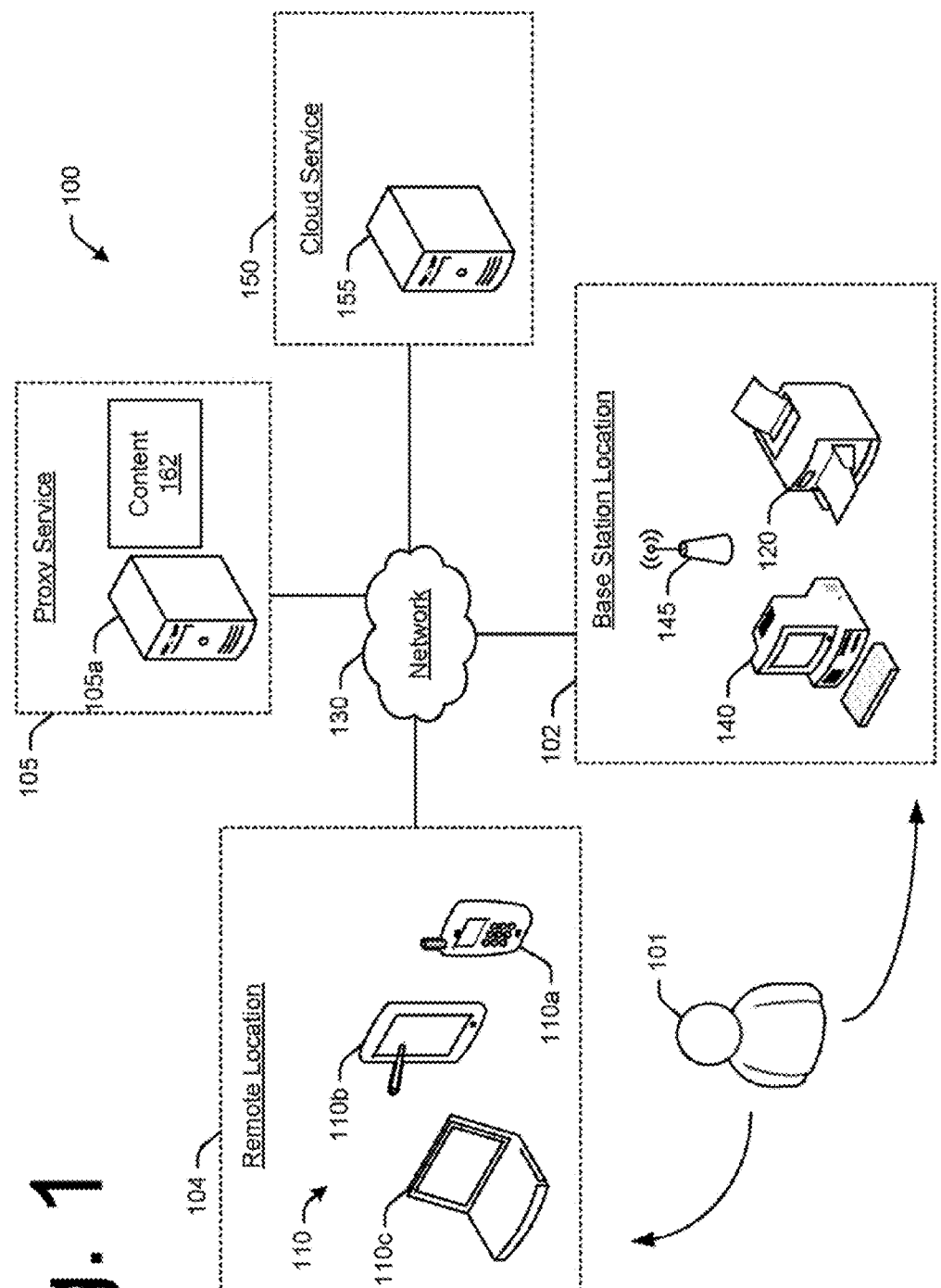
FIG. 1 is a high-level block-diagram of an exemplary networked computer system which may be implemented for establishing a secure connection between a proxy service and a base station device.

FIG. 1 is a high-level illustration of an exemplary networked computer system 100 which may be implemented for establishing a secure connection between a proxy service 105, as it may be initiated by a mobile device 110, and a base station device 120. For purposes of illustration, a mobile device 110 may be a mobile phone 110*a* (e.g., a smart phone), a tablet 110*b*, or a laptop/netbook computer 110*c*. Also for purposes of illustration, the base station device 120 may be a consumer inkjet or laser printer. However, the systems and methods described herein are not limited to use with mobile phones, laptop computers, and/or any particular type of printer.

The networked computer system 100 may include one or more communication networks 130, such as a local area network (LAN) and/or wide area network (WAN). In one example, the networks 130 include the Internet or other mobile communications network (e.g., a 3G or 4G mobile device network). A host 140 may be implemented in the networked computer system 100. The host 140 may serve as an intermediary device between the mobile device 110 and the base station device 120. The host 140 may also provide services to other computing or data processing systems or devices. For example, host 140 may also provide transaction processing services, email services, etc.

As an example, host 140 may include one or more computing systems, such as a personal computer or server computer, and may include at least some degree of processing capability and computer-readable storage. The host 140 is also connected to, or able to establish a connection with, the base station device 120. By way of example, the host 140 may be a home or office computer, and the base station device 120 may be a consumer inkjet printer. In this example, the home or office computer may be connected to the inkjet printer via a suitable wired communications link, such as a universal serial bus (USB) or over the LAN via an Ethernet connection. Alternatively, the computer may be coupled to the inkjet printer over the LAN via a suitable wireless communications link 145. In still other embodiments, the host 140 may be integrated into the base station device 120. For example, the printer may include processing capability at least sufficient to establish a communications connection directly with the network 130.

The host 140 may be provided on the network 130 via a communication connection, such as via an Internet service provider (ISP). In this regard, host 140 may be accessed by the mobile device 110 directly via the network 130, or via an agent, such as a network site. In an embodiment, the agent may include a web portal on a third-party venue (e.g., a commercial Internet site), which facilitates a connection for one or more clients with host 140. In another embodiment, portal icons may be provided (e.g., on third-party venues, pre-installed on a computer or mobile device, etc.) to facilitate a communications connection between the mobile device 110 and the host 140.

The term "mobile device" as used herein refers to any suitable computing device through which a user 101 (or users) may access the base station device 120. For purposes of illustration, the mobile device 110 may include a smart phone, a laptop/netbook computer, or a tablet device. In other embodiments, however, the mobile device 110 may refer to any computing device which is not directly connected to the base station device 120, such as an office computer when the base station device 120 is the user's printer at home, or vice versa, where the mobile device 110 refers to the users home computer and the base station device 120 is the users office printer.

It is noted, that the mobile device 110 may be connectable to the base station device 120. For example, the mobile device 110 may be connected to the base station device 120 with a so-called "hot-plug" connection, so that the mobile device 110 may serve as an interface for the base station device 120. To satisfy the definition that the mobile device 110 be usable in physically remote locations 104 from the location 102 of the base station device 120 (e.g., when the user has the smart phone at a coffee shop 104 and the printer is at home 102), the mobile device 110 is removable from the base station device 120 for accessing the base station device 120 via the secure connection described herein.

The proxy service 105 may include a proxy server 105a. As used herein, the term "proxy server" means an intermediary entity that acts as both a server and a client for the purpose of making requests on behalf of other clients (e.g., the mobile device 110). A proxy server routes requests to another entity for the user. A proxy service interprets, and, if necessary, rewrites portions of data before forwarding the request. For example, a proxy service 105 for a news organization may format data for a particular story (suitable, for display on the news organization's website) for printing on the user's base station printer 120 before issuing the print request to the printer 120.

Before continuing, it is noted that the computing devices described herein may include any of a wide variety of computing systems, such as stand-alone personal desktop or laptop/netbook computers, workstations, personal digital assistants (PDAs), tablet devices, mobile or smart phones, and appliances (e.g., devices dedicated to providing one or more service), to name only a few examples. Each of the computing devices may include memory, storage, and a degree of data processing capability at least sufficient to manage a communications connection either directly with one another or indirectly (e.g., via a network).

In use, a user may register the base station device 120 with a cloud service 150 by establishing an account with the cloud service 150. The cloud service 150 may be implemented as machine readable program code executable by a suitable computer. system (e.g., server 155). When the user goes to use the proxy service 105 (e.g., to send news updates to the user's home printer), the proxy service 105 requests a session token from the cloud service 150. The cloud service 150 issues the session token to the proxy service, which in turn, returns the session token to the user on mobile device 110. The mobile device 110 then sends the session token to the cloud service 150 and requests a session code. After receiving the session code from the cloud service 150, the mobile device 110 provides the session code to the proxy service 105, which returns the session code to the cloud service 150. The cloud service 150 confirms the session code for the particular base station device 120 that the proxy service 105 is attempting to access. The session code then enables the proxy service 105 to access the base station device 120 via the cloud service 150 for a predetermined time, even when the mobile device 110 is no longer connected with the proxy service 105.

It is noted that the proxy service may retrieve the session code from the cloud service and itself directly validate the session code provided by the mobile device. It is also noted that the Session Token (and Code) are specific to a Proxy service, not just a base station ID. That is, the session token/code created for proxy service A to access base station X is different than the session token/code for proxy service B to access the same base station.

Figure 2:
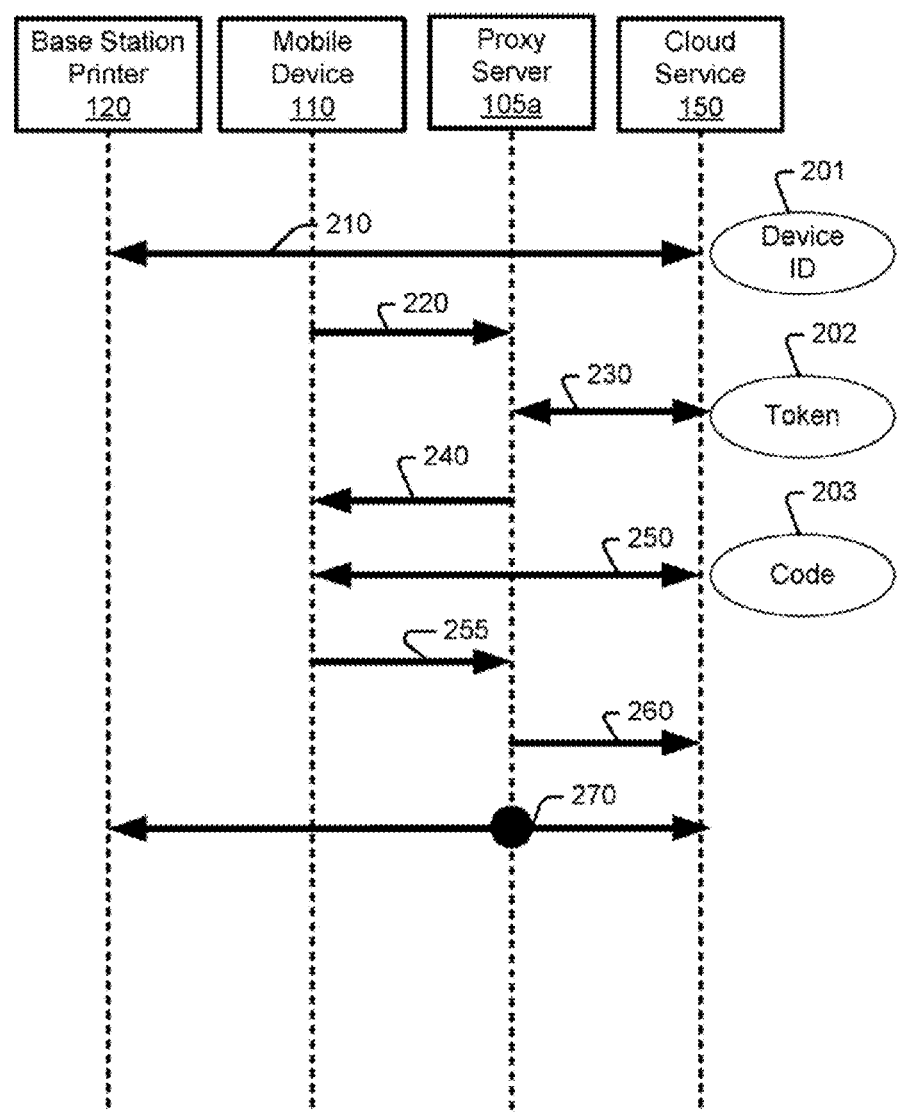
FIG. 2 is a timing diagram illustrating example communications for establishing a secure connection between a proxy service and a base station device.
Figure 3:
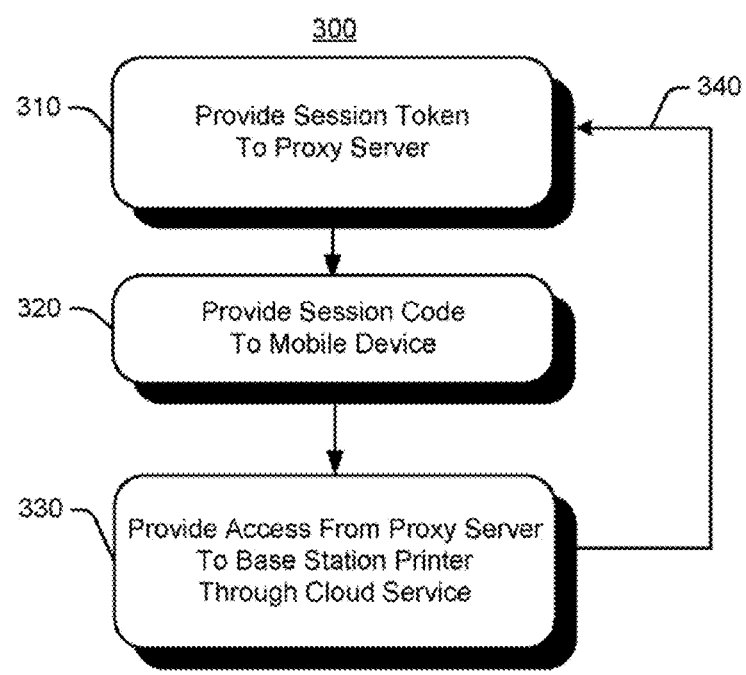
FIG. 3 is a flowchart illustrating example operations which may be implemented for establishing a secure connection between a proxy service and a base station device.

Establishing a secure connection may be better understood from the following description with reference to FIGS. 2 and 3.

FIG. 2 is a timing diagram 200 illustrating example communications for establishing a secure connection between a proxy server 105a and a base station device 120, initiated by a mobile device 110. At 210, the base station device 120 is registered with the cloud service 150. The base station device 120 may be configured to automatically request registration. Alternatively, the user may manually request registration of the base station device 120. It is noted that the user may access the cloud service 150 from the mobile device 110, or using any suitable platform (e.g., the base station device 120).

The user may set up an account, and then associate the base station device 120 with that account. The user may have more than one account (e.g., one account for each base station device). For purposes of illustration, the user may have a work account and a personal account. Alternatively, the user may associate multiple base station devices 120 with a single account. For purposes of illustration, the may include all devices at the office, home, and vacation home, in a single account.

In any event, the registration includes at least assigning a device identification (ID) 201 to the base station device 120. The device ID 201 may be unique by itself. Alternatively, the device ID 201 may be further combined with a "tag" (e.g., a user password) to make the device ID 201 unique to the base station device 120. For example, the device ID 201 may be a randomly generated alpha-numeric code (e.g., 538ABC9218). The device ID 201 may further be appended to a user email (e.g., user@hp-printers.com) such that the device ID 201 comprises a combination of the randomly generated alpha-numeric code and the user email (e.g., user@hp-printers.com538ABC9218).

The registration also includes identifying at least one mobile device 110 which is authorized to receive the session code from the cloud service 150. Accordingly, the cloud service may refuse to issue a session code to a mobile device 110 that is part of the request from the proxy service, if that mobile device 110 is not preauthorized to receive the session code. In one example, the mobile device 110 and the base station device 120 may exchange security credentials, be paired with one another, or be physically connected to one another, e.g., in a docking station or with a universal serial bus (USB) cable, before the mobile device can be identified to the cloud service 150 as an authorized mobile device.

At 220, the mobile device 110 and the proxy server 105*a* establish a communications link. For example, the mobile device 110 may log onto a website for the proxy service, and request that the proxy service issue updates to the user's home or office printer, even when the mobile device 110 is away from the printer. For purposes of illustration, the user may request a proxy service to send updates for a particular, news story, coupons, medical records, or any other data the user requests, to the user's home or office printer. To help ensure that spammers do not make such requests and that only the authorized proxy service can send data to the user's printer, the proxy service is authorized as part of a three-way authorization process, which enables the user to confirm access by the proxy service to the user's printer, even if the user is not near the printer (using the mobile device 110).

At 230, the proxy server 105*a* requests a session token 202 from the cloud service 150. The cloud service 150 responds by providing a session token 202. At 240, the proxy server 105*a* returns the session token 202 to the mobile device. As mentioned above, the session token (and session code) are specific, to a proxy service, not just a base station ID.

At 250, the mobile device 110 requests the cloud service 150 to validate the session token 202. The cloud service 150 responds by validating the session token 202 for the mobile device 110. The cloud service 150 provides a session code to the mobile device 110. At 255, the mobile device 110 responds to the proxy server 105*a* with a session code 203 received from the cloud service 150. At 260, the proxy server 105*a* provides the session code 203 back to the cloud service 150. Again, it is noted that the proxy service may retrieve the session code from the cloud service and itself directly validate the session code provided by the mobile device.

It is noted that any suitable session token 202 and corresponding session code 203 may be used. For example, the session token 202 and/or the session code 203 may be a randomly generated alpha-numeric number, similar to the device ID 201. However, the session token 202 and session code 203 are separate and distinct from the device ID 201 to provide an added level of security, though they may be used in combination with one another. For example, the cloud service 150 may use the device ID 201 and the session code 203 to confirm authorization for the proxy service 105. In addition, the session code 203 may include all or a portion of the session token 202.

In an embodiment, the session token 202 and/or the session code 203 includes a revolving code with respect to time. For example, the session token 202 and/or session code 203 may be 123ABC at time t1, and DEF456 at time t2. The device ID 201 is constant (e.g., 123XYZ789 at times t1 and t2). Accordingly, combining the revolving code with the constant device ID 201 provides an access code which is unique to the base station device 120 at different times (e.g., at times t1 and t2). Again, it is noted that the session token (and session code) are specific to a proxy service, not just a base station ID.

At some time later, the user may desire a proxy service 105 to have access to the base station device 120, even when the user is at a physically distant location from the base station 120. The user may request the proxy service 105 have access directly to the base station device 120 (via cloud service). For example, the user may desire to have newsfeeds or coupons sent from the proxy service 105 to the user's home printer 120. Or for example, the user may desire to have their medical records sent from the proxy service 105, every time there is an update, to the user's home printer 120.

At 270 the proxy service 105 may connect to the cloud service 150 and request that a print job be sent from the proxy service 105 to the base station printer 120. The cloud service 150 confirms the proxy service as being authorized to access the base station device 120 via the cloud service 150. For example, the cloud service 150 compares the session code 203 sent by the proxy service with the session code 203 that the cloud service 150 issued to the mobile device 110 for the base station device 120 (e.g., based on the corresponding device ID 201 for the base station device 120). Once confirmed, the cloud service 150 enables the proxy service 105 to access the base station device 120, even when the user is not at the base station device 120.

If the proxy server 105*a* is confirmed as having access to the base station device 120, then the cloud service 150 may process the print job requested by the proxy service. For example, the cloud service 150 may pull data from the proxy service and push the data as a print request to the base station device 120.

The user may also be able to manage one or more settings for the base station device 120 from the mobile device 110. Managing the base station device 120 may include, but is not limited to, creating and/or managing a white list and/or a black list of proxy services, accessing a job history (e.g., to check status of a print job), starting or stopping print jobs directly from the mobile device 110 to the base station device 120, and so forth.

It is noted that for security purposes, the session token 202 is only valid for a predetermined time. Expiring the session token 202 helps ensure that if the session token 202 is lost or intercepted, it cannot be used indefinitely. The time that the session token 202 remains valid may be established according to a device administrator, a device policy, the cloud service, and/or the user (e.g., when the user requests the session token 202).

For purposes of illustration, a user or administrator may set the expiration for the session token 202 at 24 hours from the time the session token 202 is requested. For example, the user may set the expiration based on how long the user wants to receive information from the proxy service. In yet another illustration, a device policy may set the expiration for the session token 202 automatically for 24 hours after it has been requested by default. In another example, the expiration of the session token 202 may correspond to an event, such as a particular news storyline ending and being archived by the proxy service.

Before continuing, it should be noted that the embodiments described above are provided for purposes of illustration, and are not intended to be limiting. Other devices and/or device configurations may be utilized to carry out the operations described herein.

FIG. 3 is a flowchart illustrating example operations which may be implemented for establishing a secure connection between a proxy server and a base station device. Operations 300 may be embodied as machine readable instructions on one or more computer-readable medium. When executed on a processor, the instructions cause a general purpose computing device to be programmed as a special-purpose machine that implements the described operations. In an exemplary implementation, the components and connections depicted in the figures may be used. A method of establishing a secure connection between a proxy server and a base station device, comprising:

In operation 310, a session token 202 for a mobile device 110 is provided by a cloud service 150 to a proxy server 105*a*.

The session token 202 may be requested from the cloud service 150 for access to the base station device 120. For example, the user on mobile device 110 may request the proxy server 105a to have access to the base station device 120. The cloud service 150 does not provide the session token 202 to the mobile device 110. Instead, the cloud service 155 provides the session token 202 to the proxy server 105a, and the proxy server 105a provides the session token 202 to the mobile device 110. The mobile device 110 may then send the session token 202 to the cloud service 155 and request a session code from the cloud service 155.

In operation 320, a session code 203 is provided directly to the mobile device 110 from the cloud service 150 based on the session token 202. For example, the cloud service may receive the session token 202 from mobile device 110 after the proxy server 105a has provided the session token 202 to the mobile device 110. The mobile device 110 provides the session code 203 to the proxy server 105a, and the proxy server 105a provides the session code back to the cloud service 150. The proxy server 105a may directly validate that the session code matches what the mobile device provided. In another example, the proxy server 105a may also pass along the session code without direct validation.

In operation 330, access may be provided for the proxy server 105a to the base station device 120 through the cloud service 150 if the proxy server 105a provided the session code 202 to the cloud service 150.

Accordingly, even when the mobile device 110 and the base station device 120 are no longer in a trusted relationship, the mobile device 110 can request services from the proxy server 105a which are executed on the base station device 120. For example, the user may be at a distant location (such as the airport) relative to the user's home printer. But the user wants to request the proxy server 105a to print news updates corresponding to a particular story the user is interested in following on the user's home printer. The user provides the proxy server 105a with the device ID 201 for the user's home printer, and after being validated, the proxy server 105a can print the updates for the story on the user's home printer via the cloud service 150.

When the session code expires, the user can request to revalidate, e.g., as illustrated by arrow 340 returning to operations 310 and 320.

It is noted that various operations may be automated or partially automated. For example, the user may select a print icon for a proxy service from the user's mobile device 110, and the validation process may be fully automated. Alternatively, at least some user interaction may be needed in order to complete the validation process. For example, the user may need to accept the session code from the cloud service. 150 and/or send the session code to the proxy server 105a.

The operations shown and described herein are provided to illustrate various embodiments for establishing a secure connection between a proxy server and a base station device. It is noted that the operations are not limited to the ordering shown. Still other operations may also be implemented.

For purposes of illustration, further operations may include expiring the session token after a predetermined time. If the session code includes the session token (e.g., in addition to a secret), then expiring the session token may also automatically expire the session code.

Further operations may also include the mobile device 110 initiating a print job at the base station device from a proxy service. Still further operations may also include registering the base station device 120 with the cloud service 150. Registering the base station.device 120 may include at least assigning a device ID to the base station device 120. For example, the printer 120 may be automatically registered when the user registers the product with the manufacturer. Or the printer 120 may be manually registered by the user. The user may register a new printer with a new user account and/or an existing user account.

It is noted that the exemplary embodiments shown and described are provided for purposes of illustration and are not intended to be limiting: Still other embodiments are also contemplated.

The invention claimed is:

1. A method comprising:
    sending, by a cloud service that is part of a cloud network to a proxy server, a session token for a mobile device, wherein the proxy server is outside the cloud network;
    sending, by the cloud service, a session code based on the session token directly to the mobile device;
    receiving, by the cloud service from the proxy server, the session code received by the proxy server from the mobile device, the session code sent by the proxy server to the cloud service to access a base station device that is separate from the proxy server;
    enabling, by the cloud service, access by the proxy server to the base station device in response to the receiving of the session code by the cloud service from the proxy server; and
    providing, by the cloud service, a job from the proxy server to the base station device, the job initiated at the proxy server by the mobile device.

2. The method of claim 1, further comprising registering the base station device with the cloud service.

3. The method of claim 2, wherein registering the base station device includes at least associating a device identification (ID) of the base station device at the cloud service.

4. The method of claim 1, further comprising:
    receiving, by the cloud service from the proxy server, a request for the session token for the proxy server to access the base station device, wherein the request received from the proxy server is responsive to a request by the mobile device.
    wherein the sending of the session token by the cloud service to the proxy server is responsive to the request.

5. The method of claim 4, further comprising:
    receiving, by the cloud service from the mobile device, the session token received by the mobile device from the proxy server; and
    validating, by the cloud service, the session token received by the cloud service from the mobile device, wherein the sending of the session code to the mobile device is in response to the validating.

6. The method of claim 1, further comprising combining the session token and a secret to generate the session code.

7. The method of claim 1, further comprising expiring the session token based on an event.

8. The method of claim 1, further comprising preauthorizing the mobile device to receive the session code before the mobile device is identified to the cloud service as an authorized device.

9. The method of claim 1, further comprising a three-way authorization process including:
    the proxy server requesting the session token from the cloud service, and the proxy server sending the session token to the mobile device; and
    the cloud service receiving a request from the mobile device to validate the session token received from the proxy server, the cloud service providing the session code to the mobile device, and the proxy server receiving, from the mobile device, the session code received by the mobile device from the cloud service, and the proxy server providing the session code back to the cloud service.

10. The method of claim 1, further comprising
the cloud service confirming the proxy service is authorized to access the base station device via the cloud service by comparing the session code received from the proxy service with the session code the cloud service sent to the mobile device,
wherein the cloud service enabling the proxy service to access the base station device is in response to the comparing.

11. The method of claim 1, wherein the cloud service is implemented by a computer server that is separate from the proxy server, and the base station device is separate from the cloud service, and wherein:
the cloud service sends the session token to the proxy server over a network; and
the cloud service enabling access by the proxy server to the base station device enables the proxy server to send data to the base station device over the network.

12. A system comprising:
a cloud service including a computer server that is part of a cloud network and configured to:
generate a session token for a mobile device,
deliver the session token to a proxy server that is outside the cloud network,
generate a session code based on the session token received from the mobile device,
deliver the session code directly to the mobile device,
receive, from the proxy server, the session code received by the proxy server from the mobile device, the session code sent by the proxy server to the cloud service to access a base station device that is separate from the proxy server;
enable access by the proxy server to the base station device in response to the receiving the session code by the cloud service from the proxy server; and
provide a job from the proxy server to the base station device, the job initiated at the proxy server by the mobile device.

13. The system of claim 12, wherein the base station device is registered with the cloud service.

14. The system of claim 13, wherein the cloud service is to receive a registration request from the base station device while the base station device has a trusted connection established with the mobile device.

15. The system of claim 12, wherein the cloud service is configured to assign the base station device a device identification (ID).

16. The system of claim 12, wherein the session token expires after a predetermined time.

17. The system of claim 12, wherein the session code is derived from the session token and is different from the session token.

18. The system of claim 12, wherein the computer server is separate from the proxy server, and the base station device is separate from the cloud service, and wherein:
the cloud service is configured to deliver the session token to the proxy server over a network; and
the cloud service enabling access by the proxy server to the base station device enables the proxy server to access the base station device over the network.

19. The system of claim 12, wherein the cloud service is configured to further:
receive, from the proxy server, a request for the session token for the proxy server to access the base station device, wherein the request received from the proxy server is responsive to a request by the mobile device,
wherein the generating of the session token by the cloud service is responsive to the request.

20. The system of claim 19, wherein the cloud service is configured to further:
receive, from the mobile device, the session token received by the mobile device from the proxy server; and
validate the session token received by the cloud service from the mobile device, wherein the generating of the session code is in response to the validating.

21. A non-transitory computer-readable storage medium storing instructions that upon execution cause a system to:
execute a cloud service including a computer server that is part of a cloud network to:
generate a session token for a mobile device;
send the session token to a proxy server over a network, the proxy server being outside the cloud network;
receive, from the mobile device, the session token that was sent by the proxy server to the mobile device;
generate a session code based on the session token received from the mobile device;
send the session code to the mobile device, to cause the mobile device to send the session code to the proxy server;
receive, from the proxy server, the session code received by the proxy server from the mobile device, the session code sent by the proxy server to the cloud service to access a printer device that is separate from the proxy server;
enable access by the proxy server to the printer device over the network in response to the receiving of the session code from the proxy server, wherein the computer server of the cloud service is separate from the proxy server, and the printer device is separate from the cloud service.

22. The non-transitory computer-readable storage medium of claim 21, wherein the cloud service is configured to establish a trusted relationship with the printer device during a registration process including the mobile device.

23. The non-transitory computer-readable storage medium of claim 21, wherein the mobile device is removable from the printer device to provide access by the proxy server to the printer device even when the mobile device is at a physically distant location from the printer device.

24. The non-transitory computer-readable storage medium of claim 21, wherein the instructions cause the system to execute the cloud service to further:
receive, from the proxy server, a request for the session token for the proxy server to access the base station device, wherein the request received from the proxy server is responsive to a request by the mobile device,
wherein the generating of the session token by the cloud service is responsive to the request.

25. The non-transitory computer-readable storage medium of claim 24, wherein the instructions cause the system to execute the cloud service to further:
validate the session token received by the cloud service from the mobile device, wherein the generating of the session code is in response to the validating.

26. A method comprising:
receiving, by a cloud service that is part of a cloud network from a proxy server that is outside the cloud network, a request for a session token for the proxy server to access a base station device, wherein the request received from the proxy server in responsive to a request by a mobile device;

sending, by the cloud service to the proxy server, the session token for the mobile device;
receiving, by the cloud service from the mobile device, the session token received by the mobile device from the proxy server;
sending, by the cloud service, a session code based on the session token directly to the mobile device;
receiving, by the cloud service from the proxy server, the session code received by the proxy server from the mobile device, the session code sent by the proxy server to the cloud service to access a base station device;
enabling, by the cloud service, access by the proxy server to the base station device in response to the receiving of the session code by the cloud service; and
providing, by the cloud service, a job from the proxy server to the base station device, the job initiated at the proxy server by the mobile device.

* * * * *

UNITED STATES PATENT AND TRADEMARK OFFICE
CERTIFICATE OF CORRECTION

| | | |
|---|---|---|
| PATENT NO. | : 9,052,861 B1 | Page 1 of 1 |
| APPLICATION NO. | : 13/072722 | |
| DATED | : June 9, 2015 | |
| INVENTOR(S) | : Laurent Pizot et al. | |

It is certified that error appears in the above-identified patent and that said Letters Patent is hereby corrected as shown below:

Claims

In column 8, line 39, in Claim 4, delete "device." and insert -- device, --, therefor.

In column 9, line 4, in Claim 10, delete "comprising" and insert -- comprising: --, therefor.

Signed and Sealed this
Twenty-ninth Day of March, 2016

Michelle K. Lee
*Director of the United States Patent and Trademark Office*